United States Patent
Bonath et al.

(10) Patent No.: US 6,969,500 B2
(45) Date of Patent: Nov. 29, 2005

(54) METHOD FOR SEPARATING TITANIUM TETRACHLORIDE

(75) Inventors: Hans-Joerg Bonath, Oberkirch (DE); Michael Ebert, Cologne (DE); Andreas Kade, Kuerten (DE); Frank Malcharek, Cologne (DE); Josef Mayer, Cologne (DE); Dirk Wolff, Hennef (DE)

(73) Assignee: Kronos International Inc, Leverkusen (DE)

( * ) Notice: Subject to any disclaimer, the term of this patent is extended or adjusted under 35 U.S.C. 154(b) by 276 days.

(21) Appl. No.: 10/376,798

(22) Filed: Feb. 28, 2003

(65) Prior Publication Data
US 2003/0170168 A1 Sep. 11, 2003

(30) Foreign Application Priority Data
Mar. 7, 2002 (DE) .......................... 102 10 180

(51) Int. Cl.⁷ .............................. B01D 53/77
(52) U.S. Cl. ..................... 423/240 R; 423/481; 95/223
(58) Field of Search ............................ 423/240 R, 481, 423/488, 492; 95/223

(56) References Cited

U.S. PATENT DOCUMENTS

| | | | | |
|---|---|---|---|---|
| 3,650,695 A | * | 3/1972 | Bogdan et al. ............. 423/613 |
| 3,690,041 A | * | 9/1972 | Low ............................. 95/225 |
| 4,442,075 A | * | 4/1984 | Rado ............................ 423/76 |
| 4,474,587 A | * | 10/1984 | Matsumoto et al. ........... 95/92 |
| 4,533,530 A | * | 8/1985 | Hartmann ............... 423/240 R |
| 4,731,230 A | * | 3/1988 | Lailach et al. ................ 423/77 |
| 5,826,800 A | | 10/1998 | Reither ....................... 239/505 |
| 6,759,018 B1 | * | 7/2004 | Arno et al. ................. 423/210 |

FOREIGN PATENT DOCUMENTS

DE 3328675 C2 2/1985
WO WO9910085 A1 4/1999

* cited by examiner

*Primary Examiner*—Ngoc-Yen Nguyen
(74) *Attorney, Agent, or Firm*—Rodney T Hodgson

(57) ABSTRACT

The invention relates to a method for separating titanium tetrachloride and the hydrolyzed reaction products of titanium tetrachloride from the exhaust gases generated during the chlorination of raw materials containing titanium by treating the exhaust gases with a first aqueous hydrochloric-acid solution of titanium oxychloride, where, in the first separation stage (2), small droplets of hydrochloric-acid titanium oxychloride solution (3) are flowed with the exhaust gas flow, and larger droplets of hydrochloric-acid titanium oxychloride solution are flowed counter current to the exhaust to remove the smaller droplets and ensure that virtually no droplets are carried to a second separation stage. In the second separation stage, a second titanium oxychloride solution is injected into a second reactor (9), the second solution having a lower titanium oxychloride concentration than that injected in the first separation stage. The method results in a lower pressure loss in the scrubber system, while retaining the same separation efficiency.

17 Claims, 1 Drawing Sheet

METHOD FOR SEPARATING TITANIUM TETRACHLORIDE

CROSS REFERENCE TO RELATED APPLICATIONS

This application claims priority pursuant to Title 35, United States Code, Section 119(a)–(d) or (f), or 365(b) to the German Patent Application Number 102 10 180.9 filed Mar. 7, 2002, where the above named application is hereby incorporated herein by reference in its entirety including incorporated material.

FIELD OF THE INVENTION

The field of the invention is the field of separating $TiCl_4$ and hydrolyzed reaction products of $TiCl_4$ from the exhaust gases generated during the chlorination of raw materials containing titanium.

BACKGROUND OF THE INVENTION

In the manufacture of titanium dioxide by the so-called chloride process, raw materials containing titanium are chlorinated at high temperatures in the presence of a compound containing carbon. The metal oxides contained therein are almost completely converted into the corresponding metal chlorides in the process. The gas leaving the chlorinator is cooled in a multi-stage process, and unreacted, dust-like educts, metal chlorides of relatively low volatility and titanium tetrachloride are separated. The gas remaining after the final stage still contains traces of highly volatile metal chlorides, typically 0.1 to 0.5% by volume $TiCl_4$, 0.1 to 0.5% by volume $SiCl_4$ and 0.5 to 9% by volume dry HCl.

The statutory regulations concerning the prevention of water and air pollution prescribe the cleaning of exhaust gases containing $TiCl_4$ and/or $SiCl_4$ prior to their being discharged into the environment. In addition, there are economic grounds for putting the residual materials occurring during a cleaning process of this kind to the most extensive possible industrial use.

DE 33 28 675 C2 ( U.S. Pat. No. 4,533,530) describes a method for cleaning exhaust gases containing $TiCl_4$ from the chlorination of raw materials containing titanium, in which the exhaust gases come into contact with aqueous titanium oxychloride solution in a spray column.

Connected directly downstream of the spray column, without intermediate separation, is an additional scrubbing device, e.g. an ring-slot scrubber, for increasing the absorption efficiency to roughly 99%. The titanium oxychloride solution with a concentration corresponding to 100 to 170 g $TiO_2/l$ is circulated via the spray column and the ring-slot scrubber in a common circuit, the concentration being controlled by adding water or hydrochloric-acid solutions to the spray column. Exhaust gases, now largely free of gaseous $TiCl_4$, pass to a separate stage to produce industrially useable HCl.

OBJECTS OF THE INVENTION

It is an object of the invention to reduce the pressure loss in a separation system separating $TiCl_4$ and the hydrolyzed reaction products $TiCl_4$ of from the exhaust gases generated during the chlorination of raw materials containing titanium in such a way that larger volumetric exhaust gas flows can be cleaned without requiring the input of additional energy while retaining the same separating efficiency.

SUMMARY OF THE INVENTION

The exhaust gases from the titanium chloride process are injected into the bottom of a spray column. Small droplets of titanium oxychloride-hydrochloric acid solution are injected at the bottom of the column and rise with the gas flow towards the top of the column. The small droplets have a relatively large surface area for removing soluble products from the exhaust gas flow. Larger droplets of the titanium oxychloride-hydrochloric acid solution are injected at the top of the column and fall through the rising gas flow to the bottom of the column. The small droplets have large enough diameter that they are not carried around the impinging large droplets, but impinge on the large droplets and coalesce and are carried to the bottom of the spray column. Relatively few droplets are carried through the spray column to a second stage separator, and hence the pressure drop in the first and second stage separator is minimized.

DETAILED DESCRIPTION OF THE INVENTION

Figure 1:
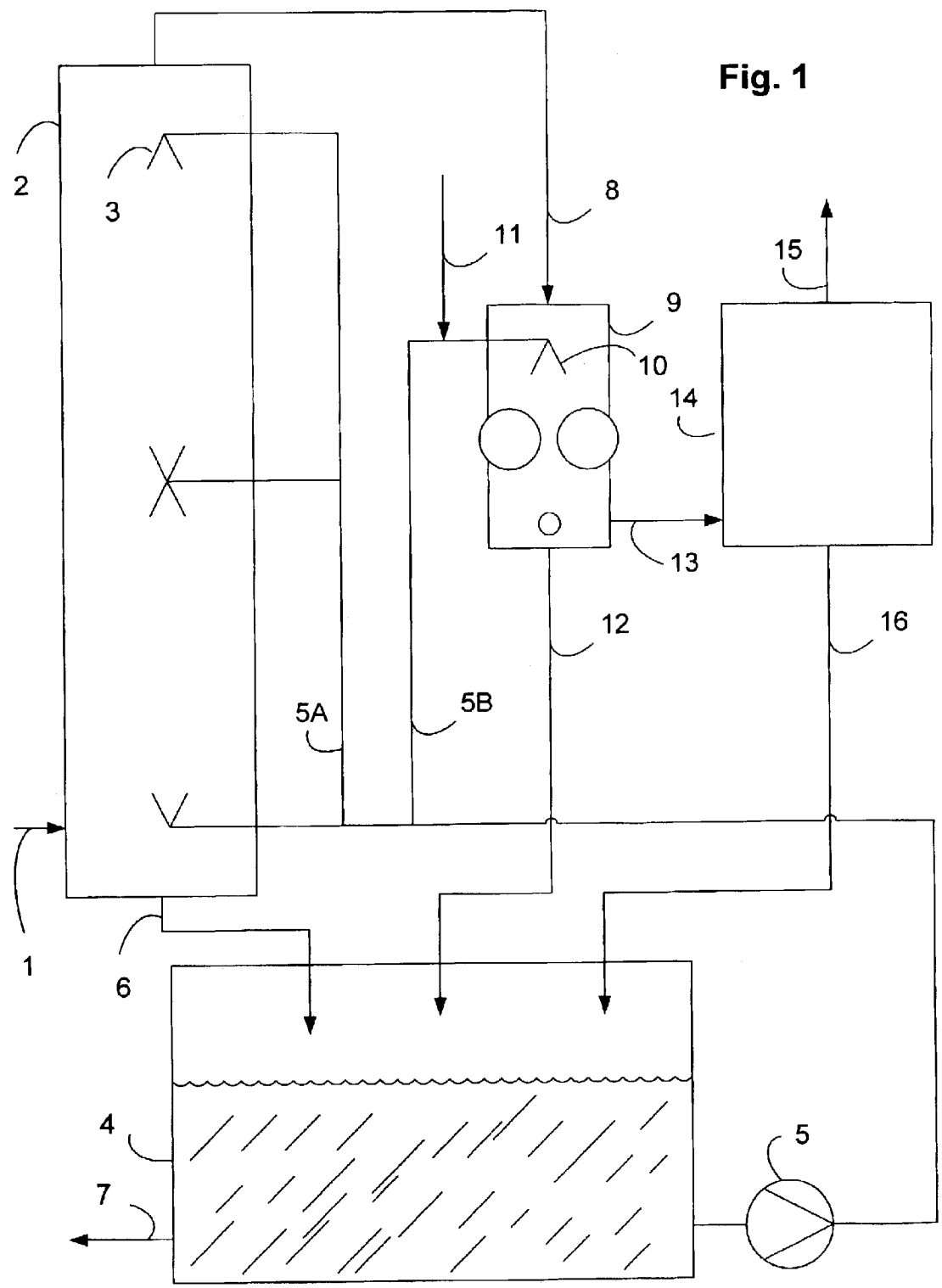
FIG. 1 shows a schematic diagram of the equipment of the invention.

The invention relates to a method for separating $TiCl_4$ and the hydrolyzed reaction products from the exhaust gases generated during the chlorination of raw materials containing titanium by treating the exhaust gases with an aqueous hydrochloric-acid solution of titanium oxychloride.

DE 33 28 675 C2 ( U.S. Pat. 4,533,530) describes a method for cleaning exhaust gases containing $TiCl_4$ from the chlorination of raw materials containing titanium, in which the exhaust gases come into contact with aqueous titanium oxychloride solution in a spray column. Connected directly downstream of the spray column, without intermediate separation, is an additional scrubbing device, e.g. an ring-slot scrubber, for increasing the absorption efficiency to roughly 99%. The titanium oxychloride solution with a concentration corresponding to 100 to 170 g $TiO_2/l$ is circulated via the spray column and the ring-slot scrubber in a common circuit, the concentration being controlled by adding water or hydrochloric-acid solutions to the spray column. Industrially usable hydrochloric acid can be obtained from the exhaust gas very largely freed of $TiCl_4$ in this way by absorption in water in a second stage, and after removal of the silicon hydroxide formed by the hydrolysis of $SiCl_4$. High pressure loss in the scrubber system of this continuous method of process control often requires facilities to input additional energy, e.g. blowers for conveying the exhaust gas or supplementary pumps for atomizing the injected scrubbing liquid.

The object of the invention was, while retaining the same separating efficiency, to reduce the pressure loss in the absorption system of the known method in such a way that larger volumetric exhaust gas flows can be cleaned without requiring the input of additional energy.

The object was met by ensuring that droplets of a first hydrochloric-acid titanium oxychloride solution and exhaust gases from the chlorination of raw materials containing titanium move in the opposite direction to the flow of exhaust gases in the separation chamber. The droplets may be fed into the separation chamber in either a counter-current direction or in the flow direction, as long as the droplet flow is opposite the flow of the exhaust gas. The absorption solution droplets are separated virtually completely from the gas flow. In a second separation stage, a titanium oxychloride solution is injected into a second reactor, the second solution has a lower titanium oxychloride concentration than that injected in the first separation stage. The second solution may be conveniently and continuously made by diluting a portion of the first solution taken from the holding tank holding the first solution.

Further advantageous embodiments of the method according to the invention can be taken from the dependent claims.

The method according to the invention is characterized in that, in the first separation stage, the titanium oxychloride solution is injected in a reactor, particularly a spray column, in such a way that the gas and the liquid come optimally into contact with each other and the greatest possible phase-boundary transition of the $TiCl_4$ from the gaseous to the liquid phase takes place. This is preferably achieved by various measures:

1. The exhaust gas and the absorption solution are essentially fed in counter-current fashion in such a way that, in total, the exhaust gas velocity is smaller than the settling velocity of the liquid particles and droplet entrainment into the subsequent fine separation stage is minimized in this way. The absorption liquid is separated as completely as possible.

2. In contrast to the teaching in DE 33 28 675 C2, it has also been found that the finest possible atomization of the absorption liquid, ruling out the risk of droplet entrainment from the spray column, is advantageous, where there is an energetically optimum range of atomization quantity and atomization pressure for the atomization process. The mean droplet diameter of the injected absorption liquid should be in the size range from less than 0.1 to 0.5 mm, preferably between 0.1 and 0.3 mm.

3. Moreover, the liquid is injected in several stages and via staggered nozzles or banks of nozzles in order to avoid gas slip. Furthermore, additional turbulence zones are created by advantageous arrangement of the nozzles.

Important for maximization of the total efficiency of the installation is that the quantity of liquid used in the first separation stage is eliminated as completely as possible, i.e. that the gas velocity set is smaller than the settling velocity of the liquid droplets. This avoids the second separation stage being charged with supersaturated solution in the form of entrained droplets, which would have a negative impact on its separating efficiency. As a result of the procedure described, the separating efficiency of the first separation stage is at least 99% of the $TiCl_4$ contained.

In the second separation stage, ultrafine separation of the residual titanium tetrachloride content from the exhaust gas flow takes place in a second reactor, in which the pre-cleaned exhaust gas is treated in a wet scrubber using a titanium oxychloride solution whose titanium oxychloride concentration is lower than in the first stage. The wet scrubber is preferably a tube-slot Venturi-type scrubber of the kind known from DE 43 31 301 C2. With optimum swirling, the pressure loss in the tube-slot Venturi-type scrubber is minimal, the total efficiency of $TiCl_4$ separation increasing to 99.9% at this point, meaning that technically utilisable, high-purity hydrochloric acid can be produced in the next process step, as described in DE 33 28 675 C2.

The scrubbing solutions of the two separation stages are recirculated via a common tank, where the fresh hydrochloric-acid solution with a concentration of 0.1 to 30% HCl, particularly 10 to 25% HCl, is preferably added in the inlet to the second separation stage. Part of the concentrated scrubbing solution is discharged from the tank intermittently or continuously. In this way, titanium oxychloride scrubbing solutions with different concentrations can be used in the two separation stages, despite the use of a common tank.

Experience has shown that the titanium oxychloride concentration of the absorption liquid of the first separation stage very rapidly increases to saturation level after circulating a few times. Although the method according to the invention can be used in the entire concentration range from 0 to the saturation limit, it has proven favorable to set a concentration range from 100 to 170 g $TiO_2$/l in order to be able to subsequently use the separation solution for the post-treatment of $TiO_2$ pigments.

In a final, third separation stage, the liquid reaction products of $TiCl_4$ still entrained from the gas flow are separated in a liquid collector, preferably a centrifugal separator optimized for the corresponding droplet size and gas velocity.

The total pressure loss of the separation system according to the invention for removing greater than or equal to 99.9% of the titanium tetrachloride contained in the exhaust gas is preferably less than 280 mbar, more preferably less than 200 mbar, and most preferably less than or equal to 110 mbar.

The invention is illustrated in FIG. 1 and explained further below on the basis of an example. In a first separation stage, exhaust gas (1) containing $TiCl_4$ is introduced at the bottom of spray column (2), in which nozzles (3) are located at several levels, injecting liquid in co-current and counter-current directions. Small droplets are injected into the rising gas flow, principally in the bottom of the column. The small droplets preferably have a small enough diameter that they are entrained in the gas flow and rise with it towards the top of the spray column (2). Larger droplets are injected into the top of spray column (2). The larger droplets have diameters large enough that they fall in a countercurrent direction through the flowing gas towards the bottom of the tank. The rising small droplets entrained with the gas then collide with the falling larger droplets, coalesce with them, and are carried towards the bottom of the reactor. The small droplets have a much higher specific surface area, and are very effective at removing the soluble material from the exhaust gas flow. If the smaller droplets have too small a diameter, they can be carried with the gas flow and move around the larger droplets instead of colliding and coalescing with them. With proper choice of droplet number, size and nozzle placement, very little liquid is carried with the gas flow from the top of the reactor to the next stage, and consequently the pressure loss occurring when the exhaust gas flows through the various separation stages is minimized. Theoretically, drops of 0.1 mm diameter fall through the gas with a terminal velocity of 1.3 m/sec. The terminal velocity rises to 2 m/sec at a droplet diameter of about 0.25 mm and 3 m/sec at a droplet diameter of 0.5 mm. Since the exhaust gas flow is typically 2 m/sec, the 0.1 and 0.25 mm diameter droplets will rise with the flowing gas or remain stationary in the column, and larger droplets will fall. However, since the droplets have some vertical velocity when they are injected, appropriate experiments will show optimal sizes and injection patterns. In particular, for faster gas flow rates, larger droplets may be injected into the bottom of the column. The hydrochloric-acid containing scrubbing solution is injected from tank (4) via pump (5) and pipe (5a), through nozzles (3) into spray column (2) and into the exhaust gas flow. The liquid draining from spray column (2) is passed via discharge pipe (6) back to pump tank (4), from where it is discharged continuously or intermittently via pipe (7). The cleaned exhaust gas, from which greater than or equal to 99% of the TiCl$_4$ vapor has been removed, leaves spray column (2) via pipe (8) and passes to the ultrafine separation stage (second separation stage) and into tube-slot Venturi-type scrubber (9). The scrubbing solution for Venturi-type scrubber (9) passes from tank (4) via pump (5) and pipe (5b) into nozzle holder (10) of Venturi-type scrubber (9). The concentration of the solution is adjusted by adding hydrochloric acid (11) to dilute the titanium oxychloride concentration from tank (4) introduced into scrubber (9) so that it is less concentrated than that sprayed into the spray column (2). The liquid drains via discharge pipe (12) into pump tank (4), while the exhaust gas, from which greater than or equal to 99.9% of the TiCl$_4$ has now been removed, passes via pipe (13) into centrifugal separator (14) for collecting liquid droplets and subsequently via pipe (15) into further cleaning stages for the removal of pollutant or toxic constituents, such as HCl, chlorine and carbon monoxide. In turn, the liquid collected in the third process stage drains via pipe (16) into the common tank (4). In order to improve the optical properties, photostability and/or processibility of TiO2 particles, they are coated in a post-treatment process with different inorganic or organic substances. In most cases this is done by a wet process with the compounds being precipitated from aqueous solutions, e.g. a Ti-oxychloride solution. The Ti-oxychloride solution drained out of tank (4) is used as one component in the post-treatment process of TiO$_2$-pigments.

Table I shows the characteristic parameters of the method according to the invention in comparison with the prior art:

TABLE I

| Parameter | Prior art as per DE 33 28 675 C2 | According to the invention |
|---|---|---|
| Total pressure loss | 280 to 300 mbar | 100 to 110 mbar |
| Exhaust gas flow | 4,000 m$^3$/h | 5,200 m$^3$/h |
| Quantity of circulating titanium oxychloride solution | 58 m$^3$/h | 35 m$^3$/h |
| Absorption surface in the spray column | 2,750 m$^2$/min | 2,750 m$^2$/min |
| TiO$_2$ content of the clean gas | 8 mg/m$^3$ at NTP | 5 mg/m$^3$ at NTP |

Table II shows measurements of system pressure drop as a function of exhaust gas flow rate and venturi throat area for 99.9% separation of Ti compounds from exhaust gases.

TABLE II

| Exhaust gas flow (m$^3$/hr at NTP) | pressure drop | | | | |
|---|---|---|---|---|---|
| | 100 (mbar) | 150 (mbar) | 200 (mbar) | 250 (mbar) | 300 (mbar) |
| 4000 | 16 (10$^{-3}$ m$^2$) | 13 | 11 | 10 | 9 |
| 4500 | 18 | 15 | 13 | 12 | 11 |
| 5000 | 20 | 17 | 14 | 13 | 12 |
| 5500 | 22 | 18 | 16 | 14 | 13 |
| 6000 | 24 | 20 | 17 | 15 | 14 |
| 6500 | 26 | 21 | 19 | 17 | 15 |
| 7000 | 28 | 23 | 20 | 18 | 16 |
| 7500 | 30 | 25 | 21 | 19 | 18 |
| 8000 | 32 | 26 | 23 | 20 | 19 |

The publications, patents, and patent publications cited herein are hereby included herein by reference in their entirety, including cited references.

Obviously, many modifications and variations of the present invention are possible in light of the above teachings. It is therefore to be understood that, within the scope of the appended claims, the invention may be practiced otherwise than as specifically described.

We claim:

1. A method for separating TiCl$_4$ and hydrolyzed reaction products of TiCl$_4$ comprising:
    a) introducing exhaust gases containing TiCl$_4$ and hydrolyzed reaction products of TiCl$_4$, the exhaust gases generated during the chlorination of raw materials containing titanium, into a first separation stage, wherein the exhaust gases are introduced into the bottom of a first separation stage spray column;
    b) injecting a first large plurality of droplets of a first aqueous hydrochloric-acid solution of titanium oxychloride at the top of the spray column, the first large plurality of droplets having a diameter sufficiently large that they fall through the upward flowing exhaust gas to the bottom of the spray column;
    c) injecting a second large plurality of droplets of the first aqueous hydrochloric-acid solution of titanium oxychloride into the spray column, the second large plurality of droplets having a diameter sufficiently small that they are entrained in the upward flowing exhaust flow and sufficiently large that an at least some of the upwardly moving droplets of the second plurality of droplets will collide with a falling droplets of the first large plurality of droplets so that the droplets coalesce and fall to the bottom of the spray column; and
    d) removing the exhaust gases from the first separation stage.

2. The method of claim 1, where the first aqueous hydrochloric-acid solution of titanium oxychloride solution has a concentration is in the range from 100 to 170 equivalent g TiO$_2$/l.

3. The method of claim 2, where the mean droplet size of the second plurality of droplets is less than 0.5 mm.

4. The method of claim 3, where the mean droplet size of the second plurality of droplets is less than 0.25 mm.

5. The method of claim 4, where the mean droplet size of the second plurality of droplets is less than 0.1 mm.

6. The method of claim 1, further comprising:
    e) removing the coalesced droplets from the first separation stage; then
    f) treating the exhaust gases removed in step d) in a second separation stage with a second aqueous hydrochloric-acid solution of titanium oxychloride, wherein the second aqueous hydrochloric-acid solution of titanium oxychloride has a lower titanium oxychloride concentration than the first aqueous hydrochloric-acid solution of titanium oxychloride, and wherein the flow of the exhaust gases is continuous from step a) through step f).

7. The method of claim 6, where the coalesced droplets from the first separation stage and hydrochloric-acid solution of titanium oxychloride recovered from the second separation stage are collected into a common tank for use in the entire separation system.

8. The method of claim 6, where a tube-slot Venturi-type scrubber is used for wet scrubbing in the second separation stage.

9. The method of claim 6, where the first aqueous hydrochloric-acid solution of titanium oxychloride is combined with another solution to make the second aqueous hydrochloric-acid solution of titanium oxychloride of step f).

10. The method of claim 9, where the first aqueous hydrochloric-acid solution of titanium oxychloride is diluted by a 0.1% to 30% HCl solution.

11. The method of claim 10, where the first aqueous hydrochloric-acid solution of titanium oxychloride is diluted by a 10% to 25% HCl solution.

12. The method of claim 6, wherein greater than or equal to 99% of the titanium compounds are removed from the exhaust gases after the first separation stage, and greater than or equal to 99.9% of the titanium compounds are removed from the gases after the second separation stage.

13. The method of claim 12, where the total pressure drop in the exhaust gases from the start of step a) to the end of step f) is less than 280 mbar.

14. The method of claim 13, where the pressure drop in the exhaust gases from the start of step a) to the end of step f) is less than 200 mbar.

15. The method of claim 14, where the pressure drop in the exhaust gases from the start of step a) to the end of step f) is less than or equal to 110 mbar.

16. The method of claim 7, further comprising:

withdrawing first aqueous hydrochloric-acid solution of titanium oxychloride from the common tank for use in post treatment processing of $TiO_2$ pigments.

17. The method of claim 7, wherein first aqueous hydrochloric-acid solution of titanium oxychloride from the common tank is combined with another solution to make the second solution of step f).

* * * * *